United States Patent [19]

Matsuda et al.

[11] Patent Number: 4,694,364
[45] Date of Patent: Sep. 15, 1987

[54] INTEGRAL DOOR AND MAGNETIC SHEET PACK HOLDER FOR USE IN A MAGNETIC RECORDING/REPRODUCING APPARATUS

[75] Inventors: Shinichi Matsuda, Saitama; Shigenori Oosaka, Kanagawa, both of Japan

[73] Assignee: Fuji Photo Film Co., Ltd., Kanagawa, Japan

[21] Appl. No.: 719,998

[22] Filed: Apr. 4, 1985

[30] Foreign Application Priority Data

Apr. 11, 1984 [JP] Japan ................................. 59-70752
Apr. 11, 1984 [JP] Japan ................................. 59-70753
Apr. 16, 1984 [JP] Japan ........................... 59-54778[U]

[51] Int. Cl.$^4$ .................... G11B 17/032; G11B 17/32
[52] U.S. Cl. ...................................... 360/99; 360/97; 360/130.34
[58] Field of Search ...................... 360/97, 99, 130.34

[56] References Cited

U.S. PATENT DOCUMENTS 4,193,102 3/1980 Beuch et al. ................... 360/130.34
4,466,032 8/1984 Saito ............................... 360/130.34

Primary Examiner—Robert S. Tupper
Attorney, Agent, or Firm—Young & Thompson

[57] ABSTRACT

A magnetic recording/reproducing apparatus using a magnetic sheet as a recording medium includes a pack holder receiving a magnetic sheet pack containing the magnetic sheet therein. This pack holder is integrally firmly secured to the inner side of a door to be opened and closed at a time when the magnetic sheet pack is loaded and unloaded. In its opened state, only a gate portion formed in the door in such a manner as to be in communication with the pack holder is exposed. When the door is closed after the magnetic sheet pack is inserted from this gate portion to load it in the pack holder, an oscillating lever is oscillated in cooperation with the movement of the door. At one end of the oscillating lever, a control plate adapted to maintain a satisfactory head contact of the magnetic head with respect to the magnetic sheet is axially attached. When the oscillating lever is oscillated as mentioned above, the control plate enters into the pack holder. When the door is locked with the body of the apparatus, the control plate is correctly positioned in a predetermined position to give access to the magnetic sheet.

8 Claims, 10 Drawing Figures

INTEGRAL DOOR AND MAGNETIC SHEET PACK HOLDER FOR USE IN A MAGNETIC RECORDING/REPRODUCING APPARATUS

BACKGROUND OF THE INVENTION

This invention relates to a magnetic recording/reproducing apparatus in which a magnetic sheet is used as a recording medium, and more particularly to a magnetic recording/reproducing apparatus which includes a moving mechanism of a control plate accessible to the magnetic sheet in order to maintain a desired head contact between a magnetic head and the magnetic sheet.

An electronic picture camera recently proposed reads out a still picture by a photographing apparatus to convert it into a video signal, and the thus-obtained video signal is recorded in a magnetic sheet by a magnetic recording apparatus. Recorded in this magnetic sheet are video signals for one scene in one track or two tracks. When the magnetic sheet is loaded into a reproducing apparatus, the video signals are reproduced and can be observed as a visible image through an output apparatus such as a picture tube and a printer.

The afore-mentioned type of a magnetic recording/reproducing apparatus is disclosed in, for example, Japanese Utility Model Early Disclosure No. 57(1982)-210696. In this prior art a magnetic sheet pack containing a magnetic sheet rotatable therein is loaded inside a pack holder. After a door is closed the pack holder is placed in a loaded position within the apparatus. According to this operation, the magnetic sheet is fixed to a spindle driven by a motor, and simultaneously, a magnetic head is caused to be in contact with the magnetic sheet. When in recording or reproducing operation, the magnetic head undertakes the magnetic recording/reproducing while the magnetic sheet is being rotated at a high speed of, for example, 3,600 rpm.

Generally in order to obtain a preferable recording/reproducing operation, it is required that a desired contact state between the recording medium and the magnetic head be maintained. However, since said magnetic sheet is extremely thin, as soon as the magnetic head contacts the recordable surface, the magnetic sheet tends to come out of contact with the head, which makes it difficult to obtain a desired head contact. In view of the foregoing, a groove is formed in a portion opposite to the magnetic head, and a control plate accessing to the magnetic sheet from the other side of the magnetic head is used. When the magnetic sheet is rotated, an air stream is produced and acts thereon to obtain a desired head contact. However, the conditions for obtaining such a desired head contact are extremely strict, and an accuracy as high as several tens of microns is required in order to repeatedly correctly position the control plate.

Said control plate is accessed to the magnetic sheet through the respective openings of a pack holder and a magnetic sheet pack during a time when the magnetic sheet is being rotated. On the other hand, the control plate must not be inside the pack holder during a time when the magnetic sheet pack is being loaded or unloaded. Because of the foregoing, according to the prior art, said control plate is mounted on the door through a spring plate so that it may be relatively movable between the door and the pack holder. And the control plate is moved in and out of the pack holder by utilizing the relative movements between the door and the pack holder which occur in opening and closing process of the door. When the door is in its locked state in the loading position, a pin planted in the apparatus body for positioning the control plate receives the control plate which is placed in the correct position by the action of a spring plate.

However, since the control plate is secured to the door in the afore-mentioned apparatus, relative movements between the door and the pack holder were indispensable in order to allow the control plate to move. Thus, the door and the holder could not be integrally constituted with respect to each other. In this way, when the door and the pack holder are separated, the door is required to be excessively rotated to open the insert gate of the pack holder. Accordingly, since the door is required to be opened widely, it is not preferable from a design view point. Moreover, since a gap is created between the door and the pack holder, there will be a possibility that the magnetic sheet pack is inserted therein by mistake. Furthermore, not only a pivotal mechanism of the door but also a pivotal mechanism of the pack holder are required, which adversely affects any serious attempts to make the apparatus compact or to reduce the number of component parts thereof. In addition, since the door and pack holder are required to be secured to the apparatus body separately, there is also an assembling disadvantage.

Furthermore, since an extremely high accuracy of repeatability of the correct positioning of the control plate with respect to the magnetic sheet and the magnetic head is required as mentioned above, if the control plate is to be secured to the door, even a slight external disorder with respect to the door adversely affects the contact opf the head against the magnetic sheet.

OBJECTS OF THE INVENTION

A first object of the present invention is to provide a magnetic recording/reproducing apparatus wherein the structure of the door assembly is simplified and which at the same time does not allow the magnetic sheet pack to be loaded by mistake.

A second object of the invention is to provide a magnetic recording/reproducing apparatus which includes a door and a pack holder integrated with each other, and a moving mechanism for accurately moving a control plate to a use position.

Another object of the present invention is to provide a magnetic recording/reproducing apparatus wherein a gate portion is formed on the door with which the pack holder is integrally formed, so that the gate portion is readily recognized as an opening for the magnetic pack to be inserted therethrough.

A further object of the present invention is to provide a magnetic recording/reproducing apparatus wherein a cut-out extending in the inserting direction of the magnetic sheet pack beyond the gate formed in the door is formed so that the magnetic sheet pack can be pushed only as far as the pack holder integrally formed with the inside of the door.

A still further object of the present invention is to provide a magnetic recording/reproducing apparatus wherein the cut-out extending in the inserting direction of the magnetic sheet pack is covered with a shutter energized in the closing direction so that the magnetic sheet pack can be easily loaded.

SUMMARY OF THE INVENTION

In order to obtain the above objects, according to the present invention, a door is mounted in such a manner as to be opened and shut with respect to the body of the apparatus including a magnetic head which accesses to the recordable surface of a magnetic sheet when in the magnetic recording/reproducing operation and a spindle adapted to rotate the magnetic sheet. Rigidly secured to the inner side of said door is a pack receiving portion for receiving a magnetic sheet pack therein. Said door is axially attached to an oscillating member provided at its one end with a control plate. Said oscillating member is oscillated in cooperation with the opening and shutting motion of said door through associating means. When said door is open, the oscillating member is held in a non-use position, and the control plate is in a position independent of the pack receiving portion. In this state, the magnetic sheet pack is inserted into the pack receiving portion from the gate portion formed in the door. When the door is shut, said oscillating member is oscillated toward a use position. As a result, said control plate enters inside the pack receiving portion and is placed in a position to access the magnetic sheet opposite to the magnetic head.

According to a preferred embodiment of the present invention, said door is made as a plastic molding of which the gate portion is formed, and the pack receiving portion is constituted as a pack holder to be attached to the inner side of said door. Said pack holder integrally formed with the door and carries a rotary shaft of an oscillating lever. Said oscillating lever is axially connected at its one end to a control plate and at its other end to a roller. Said roller is disposed in such a manner as to be rotatably moved along a guide groove formed at the body side of the apparatus, and said oscillating lever is oscillated due to the displacement of the roller according to said guide groove.

The present invention can be equally applied to a magnetic recording apparatus to be used only for photographing, such as an electronic camera, or to a magnetic reproducing apparatus for reproducing an image from a recorded magnetic sheet, or also to an apparatus having both recording and reproducing functions.

DETAILED DESCRIPTION OF THE INVENTION

Figure 1:
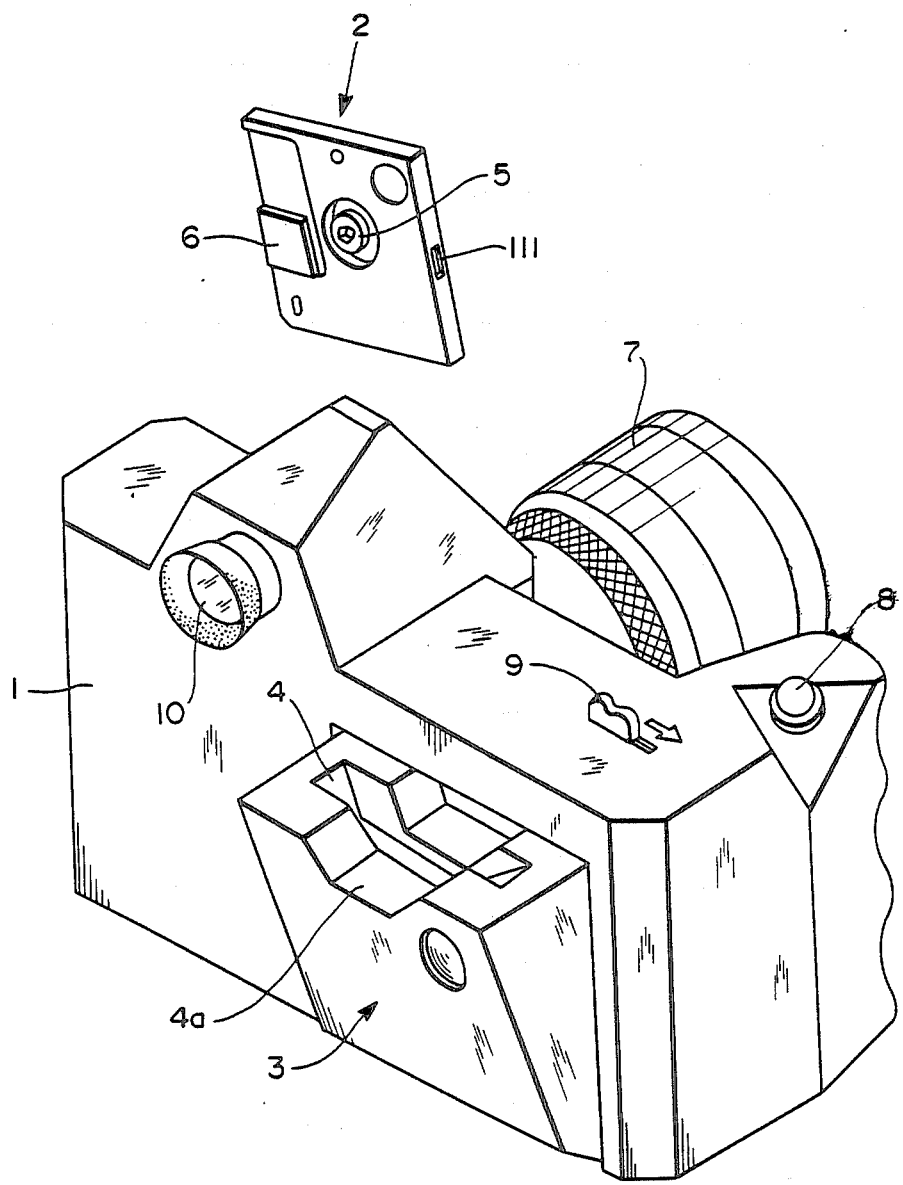
FIG. 1 a perspective view of an electronic camera to which the present invention is applied.

FIG. 1 shows an electronic camera which the present invention is incorporated. A camera body 1 is provided with a door 3 which is a plastic molding which is opened and shut when a magnetic sheet pack 2 is loaded.

The magnetic sheet pack 2 is loaded to a pack holder 28 (see FIG. 3) firmly secured to the inside of the door 3 through a gate portion 4 of the door 3. The door 3 is axially attached at its lower portion of the camera body 1, and pivoted to a loading position where the door 3 occupies a position inside of the camera body 1 from an unloading position as shown in the figure and thereby locked. Due to the foregoing loading operation, the magnetic sheet pack 2 is correctly positioned with respect to the camera body 1, and a center core 5 of a magnetic sheet 20 (see FIG. 2) exposed outside of the magnetic sheet pack 2 is fitted in the camera body 1. A shutter 6 slidably provided on the sheet pack 2 is opened by loading the magnetic sheet pack 2 into the pack holder 28 so that a magnetic head and a control plate as will be described is accessible to the magnetic sheet 20. Numeral 7 denotes a photographing lens, numeal 8 denotes a release button, numeral 9 denotes a release operation member of the door 3, and numeral 10 denotes a finder eye piece, respectively.

Figure 2A:
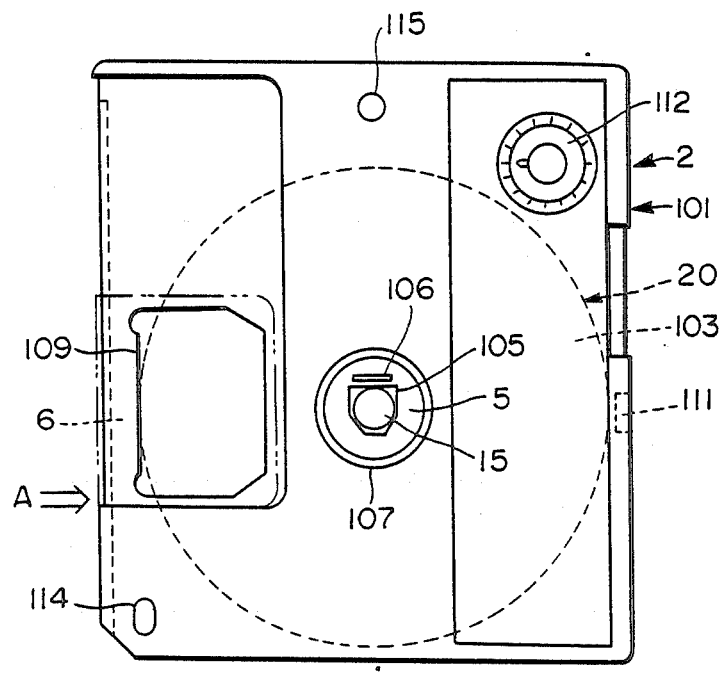
FIGS. 2 (A) and (B), respectively, are a top view and a bottom view of a magnetic sheet pack to be used in the present invention.
Figure 2B:
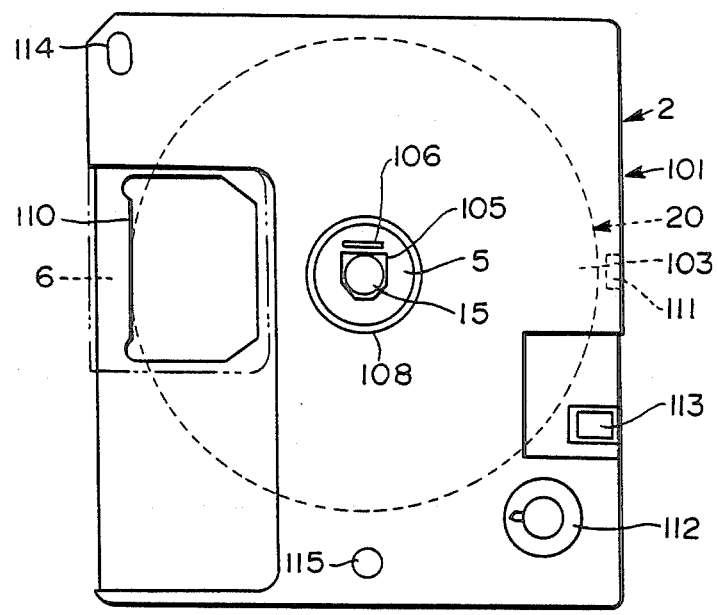

One example of the magnetic sheet pack used in the present invention is shown in FIGS. 2 (A) and (B). The magnetic sheet pack 2 comprises a pack body 101 and a magnetic sheet 20 rotatably contained therein. As shown in FIG. 1, the magnetic sheet pack 2 is inserted in the apparatus 1 with the front surface thereof facing this side in FIG. 1. The magnetic sheet 20 comprises a disc-shaped magnetic recording material 103 with a magnetic layer provided on the opposite surface thereof and a center core 5 positioned at the center of said magnetic recording material 103. Said center core 5 is formed at its center with an opening 105 and adapted to engage with a spindle 15 mounted on the foremost end of the rotary shaft of a drive motor 14 (FIG. 3) for driving the magnetic sheet. Further, the opposite surface of said center core 5 is formed of a plate made of a ferromagnetic material. Said opening 105 is formd in a generally pentagonal shape and formed in its vicinity with a slit 106. The magnetic sheet 20 is mounted on the spindle 15 with almost no play, since the spindle 15 is elastically pressurized with the elasticity of the plastic material constituting the center core 5.

A pack body 101 includes openings 107, 108 for allowing the center core 5 of the magnetic sheet 20 to be exposed therethrough, as well as openings 109, 110 for allowing the recordable surfce and unrecordable surface of the magnetic sheet 20 to be exposed therethrough. A control plate 45 is projected against the unrecordable surface through the opening 109 and a magnetic head 16 is projected against the recordable surface through the opening 110, respectively, to perform the recording or reproducing operation (see FIG. 3). The member shown by the double dotted line 6 is a shutter. When the magnetic sheet pack 2 is slidingly inserted in the pack holder 28 (FIG. 3), the shutter 6 is moved to its open position due to the pressure of a lug provided on the pack holder 28. As a result, the openings 109, 110 are opened. When the magnetic sheet pack 2 is to be pulled out, the shutter 6 is moved to its closed position to shut the openings 109, 110.

A counter indicating portion 112 is adapted to indicate the number of recorded tracks. Said counter indicating portion 112 is rotated by, for example, a head feeding mechanism 18 (FIG. 3) and caused to indicate the number of recorded tracks. A record protection pawl 113 is provided on the opposite surface of the pack body 101. The presence or absence of said record protection pawl 113 is detected by a detecting mechanism of the camera body or the reproducing apparatus, as in the case with a pawl of an audio cassette for the prevention of false erasing, so as to prevent an overlapped recording. Positioning holes 114, 115 are formed to receive therein positioning pins 21 provided on the apparatus 1 when the magnetic sheet pack 2 is loaded in the apparatus 1, thereby ensuring the correct positioning of the magnetic sheet pack 2. Numeral 111 denotes a retaining groove for retaining the pack 2 in a predetermined position in a state where the pack 2 is inserted in the pack holder 28.

Figure 3:
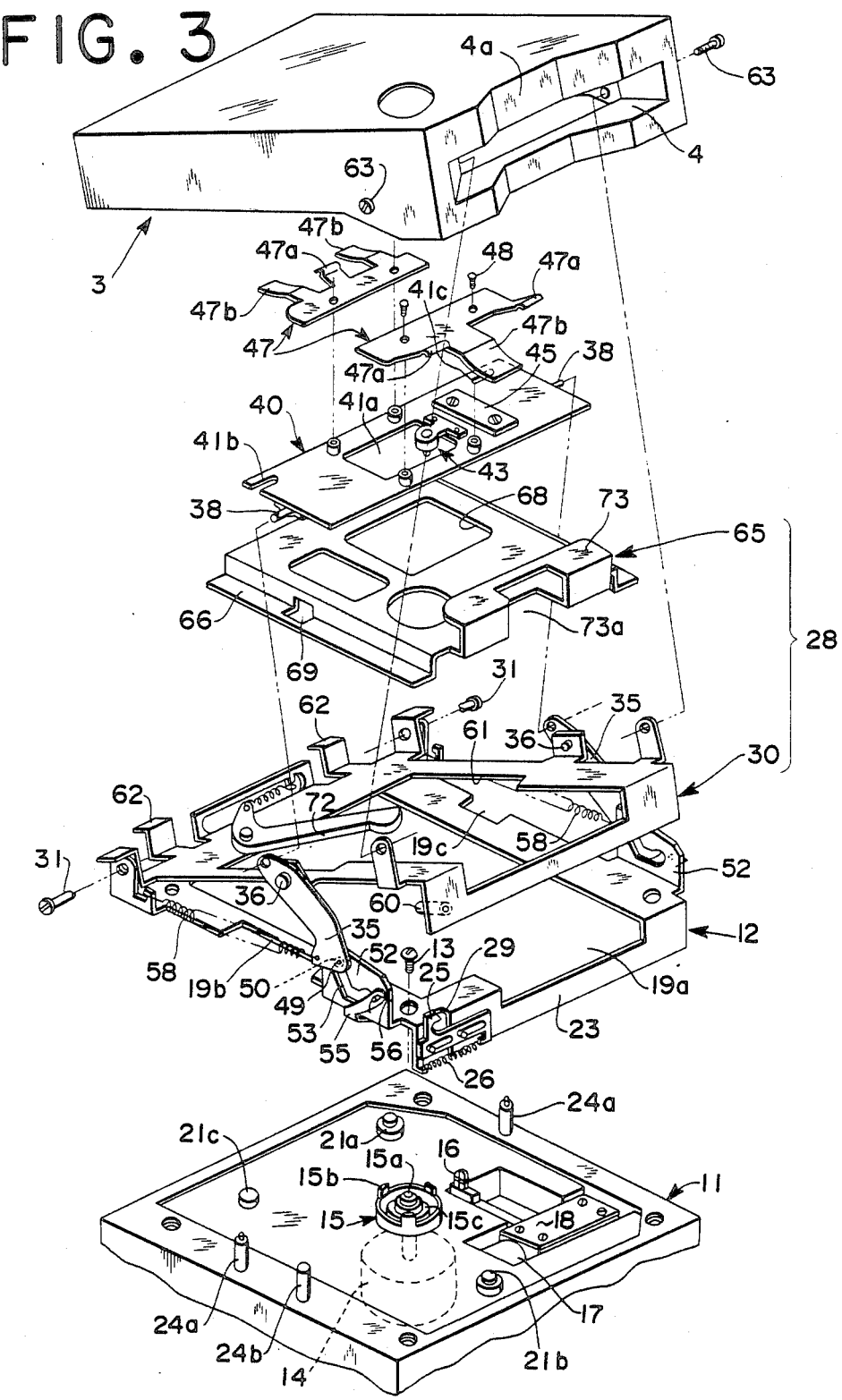
FIG. 3 is an exploded perspective view of a magnetic recording apparatus incorporated with the present invention.

In FIG. 3 where the magnetic recording reproducing apparatus is shown in its exploded state, the recording reproducing apparatus 11, detachably attached to the camera body 1, is fixed to a frame 12 by a machine screw 13. Provided on the upper surface of the recording/reproducing apparatus 11 are the spindle 15 driven by a motor 14 and a magnetic head 16 caused to be contacted with the recordable surface of the magnetic sheet 20. This spindle 15 includes a spindle shaft 15a, a flange 15b having three projections for supporting the ferromagnetic material provided on the opposite surface of the center core of the magnetic sheet, and a ring-shaped permanent magnet 15c. Said magnetic head 16 is moved in the radial direction of the magnetic sheet 20 by a head feeding mechanism 18. Also, provided on the upper surface of the recording apparatus 11 are pins 21a and 21b having small diameters at their points which fit into positioing holes 114 and 115 (FIG. 2), which have larger diameters and are formed in the magnetic sheet pack 2 thereby holding the pack at its end and a pin 21c holding the pack at its front surface. Said pin 21b serves to unlock the locking of a counter 112 of the magnetic sheet pack 2. Also, a pair of pins 24a with pointed portions having small diameters for correctly positioning the control plate and a flat headed pin 24b are planted in the upper surface of said recording apparatus body 11.

Said frame 12 is formed at its central portion with an opening 19a so that the magnetic head 16, as well as pins 21a, 21b and 21c for correctly positioning the magnetic sheet pack 2 may be projected therethrough. 19b and 19c denote cut-outs through which pins 24a, 24b may be projected for correctly positioning the control plate. Front bent portion 23 of the frame 12 is slidably attached with a hook 25 which is energized by a spring 26 toward the rightward hook position in the figure. Said frame 12 is axially attached to a holder plate 30 by a shaft 31 in such a manner as to make the holder plate rotatable with respect to the frame 12. The bent portions provided at the both sides of said holder plate 30 is axially attached with an oscillating lever 35 by a shaft 36. At one end of said oscillating lever 35, a control plate holder 40 is rotatably supported through a shaft 38. Said control plate holder 40 is formed with an opening 41a, through which a magnetic sensor 43 for detecting the standard rotating position of the magnetic sheet 20 is projected downward. Also, projected downward through this opening 41a is a center presser mechanism (not shown) for pressing the center core of the magnetic sheet 20 so that the chucking of the magnetic sheet with respect to the spindle shaft can be ensured.

Also, elongated holes 41b and 41c are provided to receive the tip portions having small diameters of the positioning pins 24a formed on the body 11 of the apparatus. The insertion of the tip portions of the positioning pins 24a in said holes 41b and 41c allows the control plate holder 40 to be correctly held in the vertical direction and in the horizontal direction with respect to the body 11. The tip portion of the projecting member 24b is abutted against the under surface of the control plate holder 40. A control plate 45 adapted to stably rotate the magnetic sheet 20 while maintaining the satisfactory head contact thereof is firmly secured to the control plate holder 40 with its groove 45a facing downward (see FIG. 7). Furthermore, said control plate holder 40 is fixed with a spring plate 47 by machine screws 48. The spring plate 47 is provided with a spring piece 47a bent upward and another spring piece 47b bent downward. The first spring piece 47a is abutted against the inner surface of the door 3 when the control plate holder 40 is lifted upward to restrict the further lifting of the control plate holder 40. Meanwhile, the second spring piece 47b presses the upper surface of the loaded magnetic sheet pack 2 downward when the control plate holder 40 descends, in order to ensure a stable mounting of the magnetic sheet.

Figure 5:
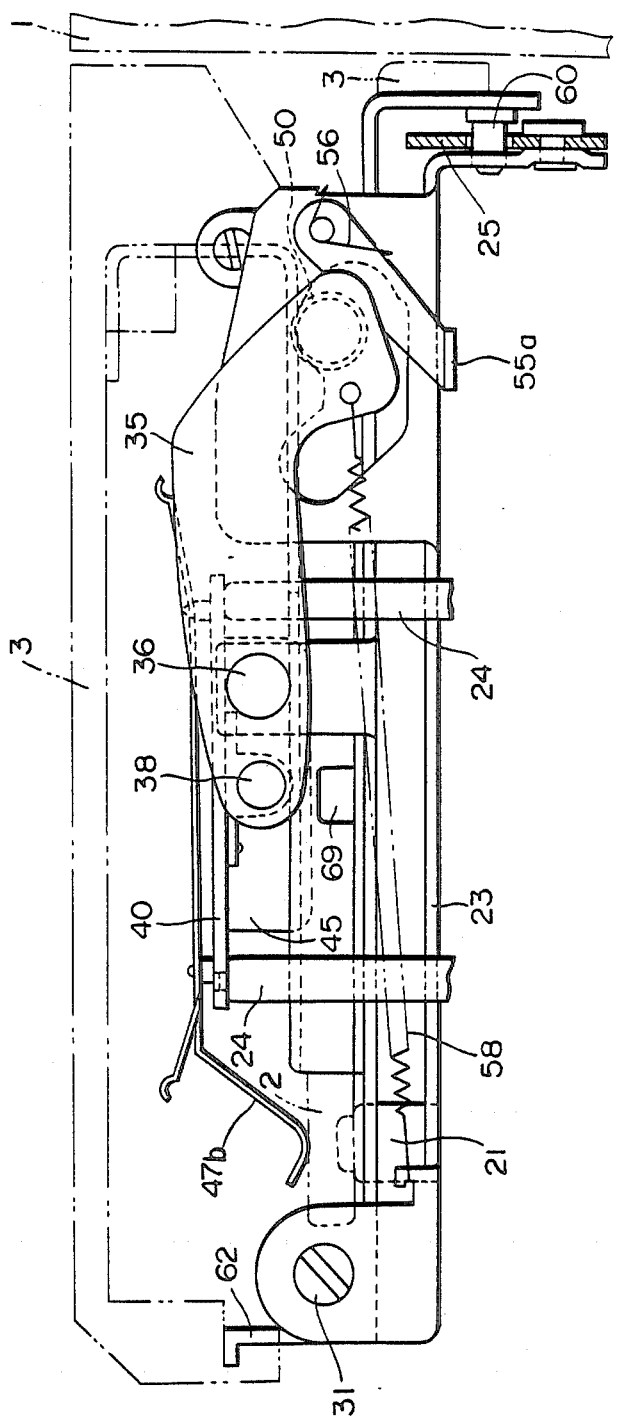
FIG. 5 is likewise a side view showing the door in its closed state.
Figure 6:
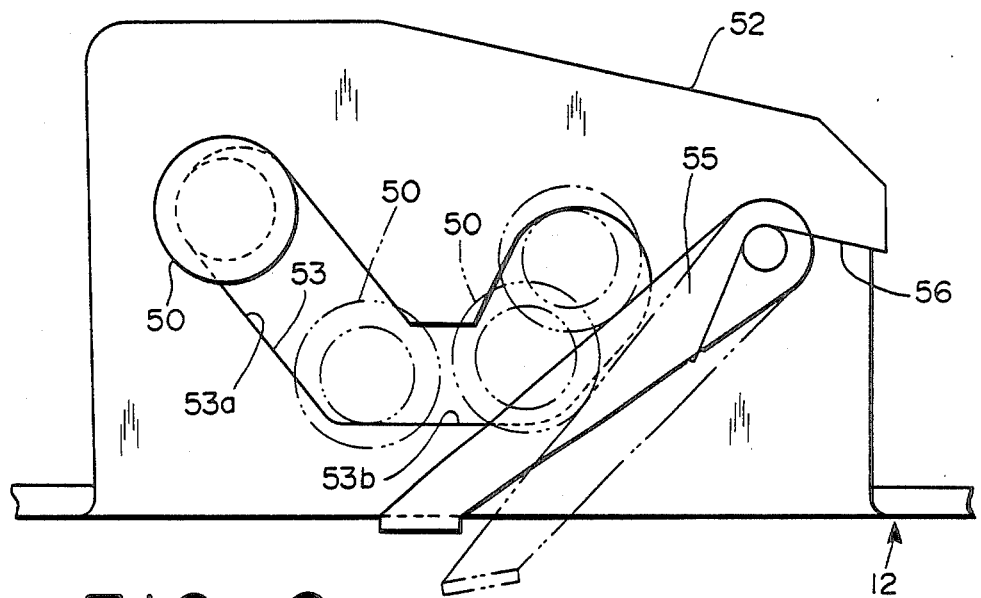
FIG. 6 is a schematic view showing the functions of a roller and a guide rim.

Said oscillating lever 35 is planted in the other end portion with a pin 49. Said pin 49 is adapted to rotatably support a grooved roller 50 (see FIG. 4 through FIG. 6). Said roller 50 is fitted at its groove with guide rims 53 formed on the bent portions 52 at the both sides of the frame 12. When the shaft 36 descends according to the pivotal movement of the door 3, the rollers 50 are moved along the guide rims 53. As a result, the oscillating lever 35 oscillates to allow the control plate holder 40 access to the magnetic sheet 20. Said guide rim 53, as shown in FIG. 6, includes an inclined portion 53a and a horizontal portion 53b. When the roller 50 is rotatingly moved along said horizontal guide rim 53b, the oscillating lever 35 is largely oscillated. In order to insure that the control plate holder 40 is correctly positioned with respect to the pins 24a and 24b, the push-up lever 55 is axially attached to the bent portion 52. Said push-up lever 55 is formed at its lower end portion with a bent porition 55a. Said bent portion 55a is usually abutted against the under surface of the bent portion 52 for the action on the spring 56. When the door is closed the oscillating lever 35 is moved downward and the roller 50 is moved along the guide rim 53 and is securely maintained under the bent portion 52. Thus the door is maintained in a closed position. When the roller is moved along the track, push-up lever 55 is moved downward and out of the way, but through the action of spring 56, push-up lever 55 is returned to its normal position such that bent portion 55a is maintained against the lower portion of bent portion 52.

Figure 4:
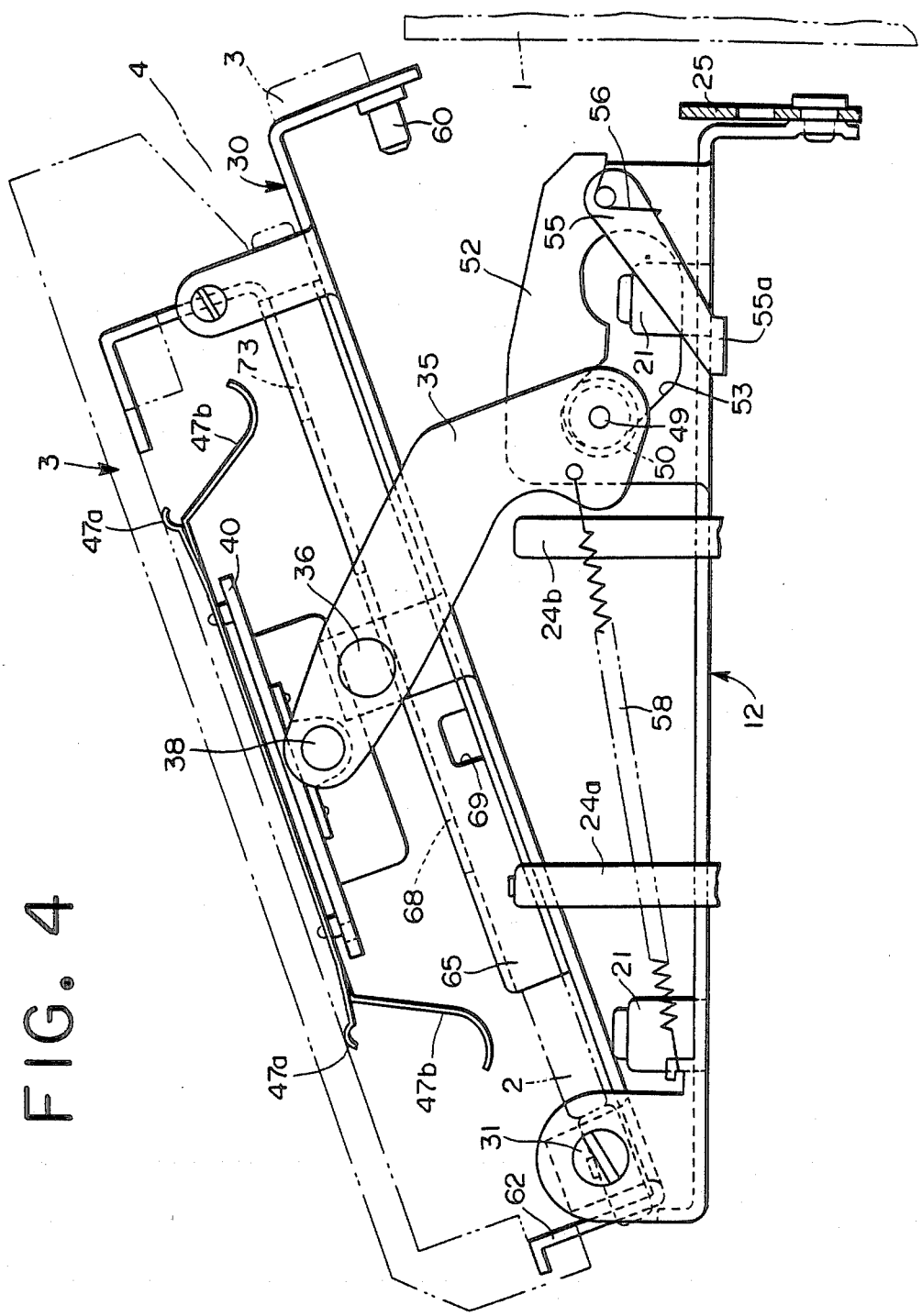
FIG. 4 is a side view showing a door in its opened state.

Said oscillating lever 35 is energized in the clockwise direction by a spring 58 stretched between its end portion and the frame 12. When the door 3 is open, it is stopped in a state as shown in FIG. 4 in which the roller 50 axially attached to the oscillating lever 35 is abutted against the upper end of the guide rim 53. When the holder plate 30 is collapsed toward the frame 12 from the position as shown in FIG. 4, a lock pin 60 planted in the front bent portion of said holder plae 30, passes through the cut-out 29 of the frame 12, presses aside the tapered surface of the hook 25 and is locked at the terminal end of its descending motion by the hook 25. Also, the holder plate 30 is formed at its central portion with an opening 61 (see FIG. 3) through which, as in the case with the opening 19a formed in the frame 12, the respective components provided on the upper surfce of the body 11 of the recording apparatus are moved to the predetermined respective portions.

Holder cover 65 is bentg at its both sides according to the thickness of the magnetic sheet pack 2, and both rim portions 66 are firmly secured to the upper surface of the holder plate 30. The pack holder 28 comprises said holder plate 30 and a holder cover 65. Said pack holder 28 contains the magnetic sheet pack 2 therein. Said pack holder 28 is firmly secured to the door 3 formed of a plastic molding by retaining pieces 62 provided at the rear rim of the holder plate 30 and machine screws 63, thereby being allowed to rotate integrally with the door 3.

The opening 68 formed in said holder cover 65 permits the magnetic sensor 43 supported by the control holder 40, the pressure member (not shown), and the control plate 45 access to the magnetic sheet 20. The opening 69 also serves as a through hole for the pack-retaining lever (not shown) which engages in a retaining recess 111 formed in the side face of the pack 2 when the magnetic sheet pack 2 is loaded within the pack holder 28. Said holder cover 65 is formed at its front edge with an upstanding portion 73 in a generally yoke shape in section which is to be inserted in the inner side of the upper front end of the door 3. Said upstanding portion 73 is also formed with an opening 73a which is to permit the spring piece 47b provided at one side of the plate spring 47 to pass therethrough.

An eject lever 72 is axially attached to the holder plate 30. When the door 3 is opened and said pack retaining lever (not shown) is released from its retaining position, the magnetic sheet pack 2 is ejected.

As shown in FIG. 4, when the door 3 is opened in its unloading position, the oscillating lever 35 is stopped in the position shown in the figure. That is, the roller 50 supported by the oscillating lever 35 through the shaft 49 is abutted against one end of the guide rim 53 and the oscillating lever 35 is restricted to oscillate in the clockwise direction. When the oscillating lever 35 is in the position shown in the figure, the control plate holder 40 is lifted upward of the holder cover 65, and the control plate 45 is free from the opening 68 formed in the holder cover 65.

When the door 3 is in its opened state, only the gate portion 4 is opened. Since there is no other gap through which the magnetic sheet pack 2 can be inserted by mistake, the magnetic sheet pack 2 will always be correctly inserted through said gate portion 4. When the magnetic sheet pack 2 is inserted from the gate portion 4, said pack retaining lever (not shown) is engaged in the retaining recess 111 (see FIG. 2) formed at the side portion of the magnetic sheet pack 2 through the opening 69 and keeps the magnetic sheet pack 2 from slipping out. Since the respective spring pieces 47a of the spring plates 47 mounted on the control plate holder 40 are firmly abutted against the inner surface of the door 3, the control plate holder 40 is caused to be in parallel with the door 3 in its raised position.

When the door 3 is pivoted in the clockwise direction and closed, the shaft 36 which serves as the supporting point of oscillation of the oscillating lever 35 is moved downward. Together with this, the roller 50 attached to the oscillating lever 35 is, as shown in FIG. 6, moved downward toward the horizontal guide portion 53b while guided by the inclined surface guide portion 53a of the guide rim 53. Said oscillating lever 35 is oscillated only a little within the area guided by said guided surface guide portion 53a.

As the door 3 is pivoted further, the roller 50 reaches the horizontal guide portion 53b of the guide rim 53 and thereafter moves in the horizontal guide portion 53b rightward until it reaches the position where the large diameter portion of the roller 50 is abutted against the push-up lever 55. When the roller 50 moves along the horizontal guide portion 53b, one end of the oscillating lever 35 is restricted to move downward through the roller 50. However, since the shaft 36 is moved downward, the oscillating lever 35 is oscillated in the counterclockwise direction against the biasing force of the spring 58. Accordingly, the control plate holder 40 supported on the upper end of the oscillating lever 35 is moved downward toward the holder cover 65. Together with this, the pack holder 28 is moved downward, the pins 21 of the body 11 of the recording apparatus are fitted in the magnetic sheet pack 2 and the pin 21c receives the under surface of the magnetic sheet pack 2, thereby correctly positioning the magnetic sheet pack 2.

After the magnetic sheet pack 2 is correctly positioned, when the door 3 is further pivoted, the center presser member (not shown) enters from the opening 68 of the holder cover 65 to firmly press the center core 5 of the magnetic sheet. As a result, the center core 5 is fixed to the shaft 15a of the spindle 15. Since a metal plate 5a (see FIG. 7) is firmly secured to the under surface of the center core 5, it is attracted and held by the permanent magnet 15c. Also, together with this, the control plate 45 enters through the opening 68 of the holder cover 65 and the shutter 6 of the magnetic sheet pack 2 is opened, the under surface of the control plate 45 is accessed to the outer surface of the magnetic sheet.

Figure 7:
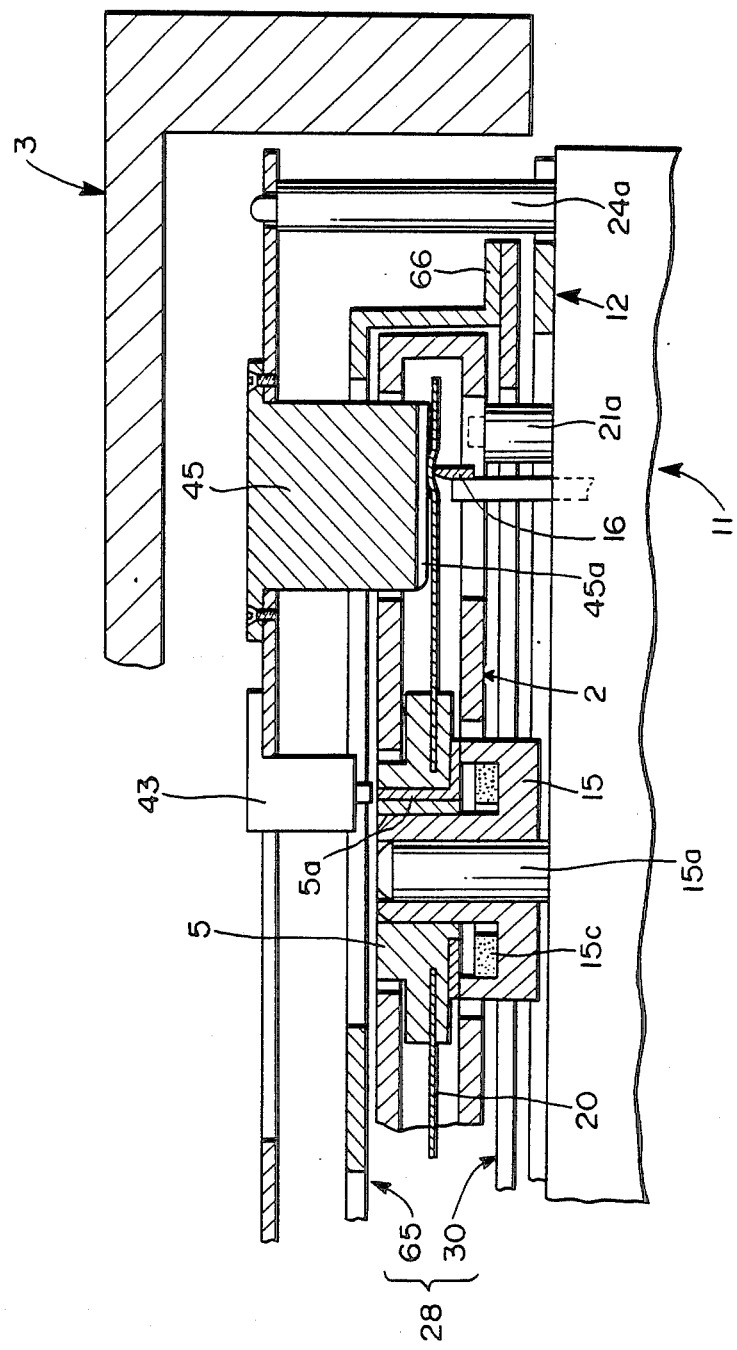
FIG. 7 is a sectional view of the peripheral region of a control plate showing the loading state.

Since the push-up lever 55 is moved in the clockwise direction by the spring 56 and is generally moved in a direction transverse to the longitudinal direction of the spring 58 attached to the oscillating lever 35, when the door 3 is continuously pivoted, the roller 50 is moved upward along the push-up lever 55 and the oscillating lever 35 is further oscillated in the clockwise direction. Consequently, the control plate holder 40 is moved downward until it is abutted against the pin 24 for positioning the control plate and thereby stopped. In the meantime, the control plate 45 is further accessed to the magnetic sheet surface and, as shown in FIG. 7, the under surface of the control plate 45 is positioned in a predetermined position slightly spaced from the outer surface of the magnetic sheet. Said center presser member is preferably arranged in such a manner as to be spaced from the core after the center core is firmly pressed once, so that unnecessary friction will not be applied to the center core 5 during the time when the magnetic sheet 20 is being rotated.

Even after the control plate holder 40 is correctly positioned by the pins 24a, the door 3 is slightly pivoted. In this case, the roller 50 pushes the push-up lever 55 and the oscillating lever 35 is slightly oscillated in the clockwise direction for partially escaping. And, since the oscillating lever 35 is pushed by the push-up lever 55 to the extent of said escape, the control plate holder 40 is firmly pressed against the pin 24. The oscillating lever 35 forms a lever swingable about the shaft 36. Accordingly, by utilizing the small force of the spring 56, the control plate holder 40 is strongly held against the projecting member 24b, thereby correctly positioning the control plate 45 in the height direction as well as the horizontal direction with respect to the body. Also, since the force of the spring 56 is always applied to the control plate holder 40, even if an external force should be applied to the door 3 during the time when the recording or reproducing operation is going on, the stable positioning relation of the control plate can be always maintained. Also, the provision of the push-up lever 55 relieves the necessity of having an accurate agreement of the timing of the positioning between the lock of the door 3 and the control plate holder 40 which offers the advantage that the processing and assembling are easy. After said control plate 45 is correctly positioned, the lock pin 60 provided on the holder plate 30 is retained by the hook 25 and the door 3 is stopped in its locking position (FIG. 5). In this state, the magnetic sheet pack 2 is pressed downward by the spring piece 47b and its under surface is, as shown in FIG. 4, fitted to and abutted against the pin 21c thereby correctly positioning it in the horizontal direction as well as in the vertical direction.

In the state where the door 3 is locked, as shown in FIG. 7, the magnetic sheet 20 is fixed to the spindle 15, and the metal plate 5a of the center core 5 is attracted and held by the permanent magnet 15c. Also, by detecting the leakage flux from the metal piece extending upward of the center core by the magnetic sensor 43, the rotary phase of the magnetic sheet 20 can be properly controlled. Also, the magnetic head 16 is in contact with the recordable surface and the control plate 45 is positioned in the predetermined position in such a manner as to be opposite to the magnetic head 16. In this way, the loading is completed. When a picture is taken, the magnetic sheet 20 is rotated at 3600 rpm by the motor 14, and video signals for one field or one frame are recorded on the recordable surface of the magnetic sheet 20 by the magnetic head 16. The air flow producd by the rotation of said magnetic sheet 20 acts between the magnetic sheet 20 and the control plate 45. As a result, the magnetic sheet 20 is brought into a satisfactory abutment against the magnetic head 16.

When the magnetic sheet pack 2 is taken out after a picture is taken, the release operation member 9 of the door 3 is operated to make the hook 25 slide to the lock releasing position in order to release the lock pin 60. Since the oscillating lever 35 is oscillated in the clockwise direction due to the energizing force of the spring 58 to pivot the door 3 in the counterclockwise direction, the door 3 is gradually opened. Toward the end of the opening process, the engagement of the pack retaining lever with the side surface of the magnetic sheet pack 2 is released, and the magnetic sheet pack 2 is ejected by the eject lever 72 until a part of the magnetic sheet pack 2 emerges from the gate portion 4.

Figure 8:
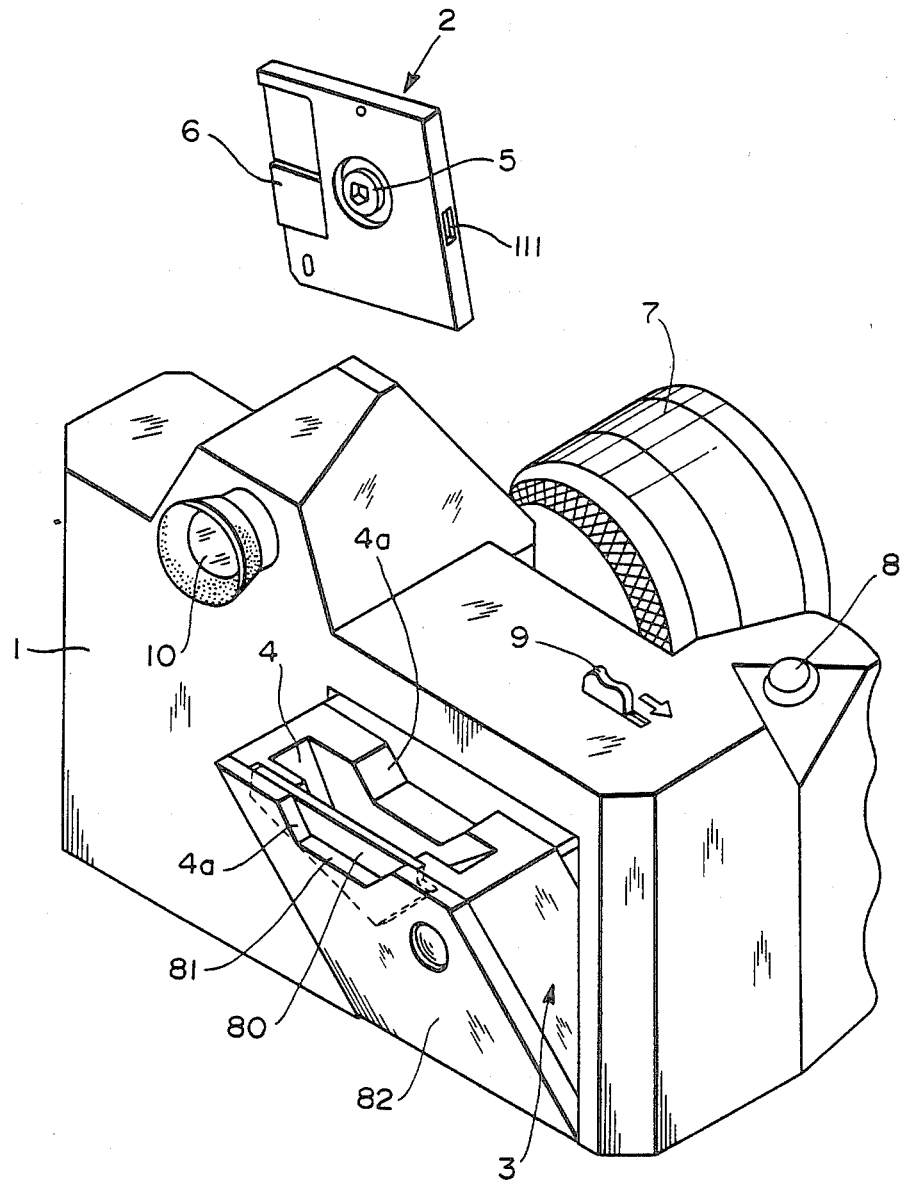
FIG. 8 is a perspective view of an electronic camera to which another embodiment of the present invention is applied.

The width of the opening of said gate portion 4 is determined according to the thickness, about 3.6 mm, of the magnetic sheet pack 72. However, since the width of the opening of said gate portion 4 is narrow compared with the user's finger, it is difficult to insert the magnetic sheet pack 2 to a predetermined position by pushing with the finger. In view of the foregoing, said gate portion 4 is formed with a cut-out 4a, so that the magnetic sheet pack 2 can be easily inserted. However, when the door 3 is formed with the cut-out 4a as mentioned above, even in the locked state in the closed position of the door 3, said cut-out 4a remains exposed as a gap. Accordingly, dust and water are likely to enter the body of the apparatus therethrough and foul an internal mechanism such as the magnetic head. As result, a normal operation is likely to be jeopardized. In order to prevent this, it is preferable to provide a shutter 80 energized in such a manner as to normally close said cut-out 4a as shown in FIG. 8. This shutter 80 is covered with a cosmetic panel 82 formed with a cut-out 81 similar to the other cut-out 4a.

Figure 9:
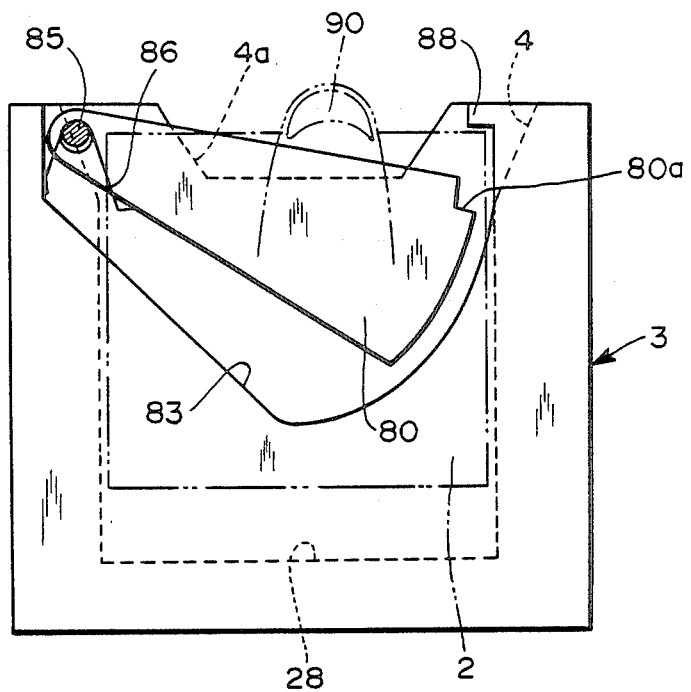
FIG. 9 is a schematic view showing the structure of a shutter provided on the door of the electronic camera shown in FIG. 8.

FIG. 9 illustrates a state in which said cosmetic panel 82 is removed. Said door 3 is formed at its upper surface with a recess 83, in which a shutter 80 is contained and axially supported by a shaft 85. This shutter 80 is energized in the direction to shut the cut-out 4a by a spring 86, and an engaging portion 80a abuts against a projecting member 88 and stops the shutter there. The pack holder 28 (see FIG. 3) is firmly secured to the inner side of the door 3. When the opening and closing member 9 is operated to open the door 3 in its position shown in FIG. 8, the gate portion 4 is exposed. The magnetic sheet pack 2 is inserted through this gate portion and loaded within the pack holder 28. At this time, as shown in FIG. 9, since a finger 90 pushing the rear end of the magnetic sheet pack 2 can be inserted so far as to the cut-outs 4a, 81, the magnetic sheet pack 2 can be correctly pushed into the predetermined position. In this case, since the shutter 80 is pushed with the finger 90, it is pivoted in the clockwise direction against the spring 86 to open the cut-out 4a. When the shutter 6 is opened at the time when the magnetic sheet pack 2 is inserted, the magnetic sheet pack 2 is held by the lock member (not shown) so that the magnetic sheet pack 2 will not slip out. Thereafter, when the finger 90 is released from the magnetic sheet pack 2, the shutter 80 is pivoted in the counter clockwise direction by the spring 86, and the cut-out 80a is stopped in a position where it abuts against a projecting member 88, and the cut-out 4a is closed by the shutter 80. Accordingly, even when the door 3 is closed, extra caused by the cut-out 4a will be covered.

What is claimed is:

1. A magnetic recording/reproducing apparatus comprising: a body; a door which swings so as to open and close with respect to the body of the apparatus; a spindle which engages an opening of a magnetic sheet placed in the apparatus so as to rotate said magnetic sheet; a magnetic head and a head feeding means, such that said magnetic head is moved in a radial direction with respect to said magnetic sheet by said head feeding means; a pack receiving portion with an opening to receive a magnetic sheet pack rotatably containing said magnetic sheet therein, said door and said pack receiving portion being integrally formed and rotatable around a shaft, such that said door and said pack receiving portion may be swung to an open position away from said body of said apparatus and may be swung back to a closed position flush with said body, wherein the door is locked in a closed position with said body of the apparatus by a locking means after insertion of a magnetic sheet pack so that said magnetic sheet is mounted on said spindle and simultaneously said magnetic sheet is in contact with said magnetic head; said apparatus further comprising:

an oscillating member rotatably supported on a second shaft extending through a hole in said pack receiving portion;

wherein when said pack receiving portion and said door integrally move toward said closed position said oscillating member oscillates toward a use position wherein said magnetic sheet is in contact with said magnetic head, said oscillating member oscillating toward a non-use position when said door is in an open position wherein said magnetic head is out of contact with said magnetic sheet; and a control plate mounted on a control plate holder, said holder including a holder shaft disposed in a hole in an upper end of said oscillating member such that when said oscillating member oscillates towards a use position, said control plate holder is brought downward to cause said control plate to enter into said magnetic pack receiving portion to give access to the magnetic sheet from a side opposite the magnetic head with respect to said magnetic head such that said magnetic sheet is disposed therebetween when said oscillating member is oscillated towards said closed use position, the head control plate moving away from said pack receiving portion when said oscillating member is moved toward said open non-use position.

2. A magnetic recording/reproducing apparatus according to claim 1, wherein said door is a plastic molding containing a gate portion such that said magnetic sheet pack enters said pack receiving portion through said gate.

3. A magnetic recording/reproducing apparatus according to claim 2, wherein said gate portion is formed with a cut-out for allowing a user to push said magnetic sheet pack into said pack receiving means when said magnetic sheet pack is to be inserted for a predetermined distance into said magnetic sheet pack receiving means, said cut-out being closed with a normally closed shutter supported by a shaft and urged closed by a spring such that when said shutter is lowered for inserting said magnetic sheet pack said spring acts to return said shutter to a position to cover said cut-out.

4. A magnetic recording/reproducing apparatus according to claim 1, wherein said cooperatively associating means comprises a roller axially attached to the other end of said oscillating member, and a guide plate firmly secured to said body of the apparatus and formed with a guide groove for allowing said roller to penetrate therethrough, said oscillating member being controlled with its oscillating movement by restricting the passage along which said roller rotatingly move by means of said groove.

5. A magnetic recording/reproducing apparatus according to claim 4, wherein said oscillating member is urged by a spring toward said non-use position.

6. A magnetic recording/reproducing apparatus according to claim 5, wherein said control plate is axially attached to one end of said oscillating member.

7. A magnetic recording/reproducing apparatus according to claim 6, further comprising, a stopper firmly secured to said body of said apparatus, wherein said control plate is correctly positioned by being abutted against said stopper when said oscillating member is in its closed use position.

8. A magnetic recording/reproducing apparatus according to claim 7, further comprising a terminal portion of said guide groove and a push-up lever attached to said pack receiving means, wherein said terminal portion of said guide groove is wider than the diameter of said roller, said when said oscillating member is moved to said use position said roller moves to said terminal portion of said guide groove, said push-up lever pivoting to allow said roller to enter said terminal portion, said push-up lever then returning to a position to hold said roller in said terminal portion.

* * * * *